US005288161A

United States Patent [19]

Graves et al.

[11] Patent Number: 5,288,161

[45] Date of Patent: Feb. 22, 1994

[54] QUICK RELEASE LOCK MECHANISMS

[75] Inventors: Howard Graves, Berlin; Richard L. Barker, Apple Creek, both of Ohio

[73] Assignee: The Wooster Brush Company, Wooster, Ohio

[21] Appl. No.: 835,319

[22] Filed: Feb. 14, 1992

[51] Int. Cl.$^5$ .......... B25G 3/18; B25G 3/26; B25G 3/28; F16B 21/12

[52] U.S. Cl. .......... 403/324; 403/325; 403/327; 403/330; 15/145; 15/146

[58] Field of Search .......... 15/145, 146; 403/324, 403/325, 330, 327

[56] References Cited

U.S. PATENT DOCUMENTS 844,130 2/1907 Howard .
986,761 3/1911 Roscoe .
1,041,286 10/1912 Hoskins .......... 15/145
1,534,401 4/1925 Lappert .......... 15/145
2,043,598 6/1936 Subia .
2,843,400 7/1958 Van Doren .
2,921,326 1/1960 Lautmann .......... 15/145
3,076,217 2/1963 Scholl .
3,485,520 12/1969 Alexander .......... 15/145 X
3,610,092 10/1971 Miller .
3,790,232 2/1974 Alvarez .
3,910,590 10/1975 Ekstrom .
4,068,346 1/1978 Binder .
4,157,598 6/1979 Talent et al. .
4,373,828 2/1983 Sartori .......... 15/145 X
4,380,349 4/1983 Bray .
4,406,559 9/1983 Geertsema et al. .......... 15/145 X
4,541,139 9/1985 Jones et al. .......... 15/145 X
4,642,837 2/1987 Nichols et al. .
4,684,283 8/1984 Lewis .
4,711,596 12/1987 Bruderer .

FOREIGN PATENT DOCUMENTS 0214605 5/1957 Australia .......... 15/145
0029054 2/1984 Fed. Rep. of Germany .......... 15/145
0318162 2/1957 Switzerland .......... 15/145

OTHER PUBLICATIONS

The Condensed Chemical Dictionary, Arthur and Elizabeth Rose, Sixth Edition, 1961, NY, pp. 819 and 917.

*Primary Examiner*—Randolph A. Reese
*Assistant Examiner*—Christopher J. Novosad
*Attorney, Agent, or Firm*—Renner, Otto, Boisselle & Sklar

[57] ABSTRACT

Quick release lock mechanisms for releasably connecting an extension pole to a tool handle include an adaptor attached to an end of the extension pole having a smooth cylindrical outer end portion axially slidable into and out of an internally threaded bore in the tool handle. A bearing support is provided for the cylindrical outer end portion when fully inserted into the bore. Also, a non-rotatable connection is provided between the adaptor and tool handle when the cylindrical outer end portion is fully inserted into the bore to prevent relative rotation therebetween, and a releasable latch prevents the cylindrical outer end portion from being withdrawn from the bore unless released.

43 Claims, 3 Drawing Sheets

QUICK RELEASE LOCK MECHANISMS

FIELD OF THE INVENTION

This invention relates generally to quick release lock mechanisms for releasably connecting a handle extension to a tool handle.

BACKGROUND OF THE INVENTION

It is generally known to provide different types of tools such as paint applicators and the like with handle extensions to allow the operator to use the tools in areas normally beyond the operator's reach without having to use a ladder. The most common way of attaching a handle extension to a tool handle is to provide a threaded connection therebetween. However, one of the disadvantages of this type of connection is that the tool may rotate in the unscrewing direction relative to the handle extension during use, making the connection somewhat unstable. Also, it can be somewhat tedious to thread and unthread the handle extension from the tool handle especially when the need to do so occurs fairly frequently.

Another drawback to providing this type of threaded connection is that a tool handle with an internally threaded bore cannot readily be molded hollow out of a relatively inexpensive plastic such as polypropylene to a relatively large outer diameter for ease of gripping.

Latches of various types have also been used to connect a handle extension to a tool handle. Moreover, keys have been used to prevent relative rotation between a tool and tool handle or tool and tool retainer.

However, there is a need for a lock mechanism for positively locking a handle extension to a tool handle in a more quick and facile manner. Moreover, there is a need for such a lock mechanism that also allows a conventional threaded handle extension to be threadedly connected to the tool handle. Furthermore, there is a need for such a lock mechanism that can be used to connect a handle extension to a tool handle that is molded hollow to a relatively large size out of a relatively inexpensive plastic such as polypropylene.

SUMMARY OF THE INVENTION

The present invention provides quick release lock mechanisms that allow for the quick and easy attachment and removal of a handle extension to and from a tool handle.

In accordance with one aspect of the invention, an adaptor is provided at one end of the handle extension and includes a smooth cylindrical outer end portion protruding outwardly therefrom for sliding receipt in an internally threaded bore in the tool handle. Cooperating bearing surfaces on the adaptor and tool handle support the cylindrical outer end portion when fully inserted into the bore. Also, a non-rotatable connection is provided between the adaptor and tool handle when the cylindrical outer end portion is fully inserted into the bore to prevent relative rotation therebetween, and a releasable latch prevents the adaptor from being withdrawn from the bore unless released.

In accordance with another aspect of the invention, the lock mechanisms are easily adaptable to a tool handle molded hollow to a relatively large outer diameter out of a relatively inexpensive plastic for easy gripping. To that end, the lock mechanisms may include an insert mounted within the tool handle which is made of an engineering plastic and contains an internally threaded bore in which the adaptor on the handle extension is slidably received.

In accordance with yet another aspect of the invention, the insert is non-rotatably mounted within the tool handle, and non-rotatably receives the adaptor when inserted therein.

In accordance with still another aspect of the invention, a locking member is mounted on the adaptor for movement into and out of locking engagement with one or more cooperating locking members on the tool handle.

In accordance with a further aspect of the invention, the cylindrical outer end portion of the adaptor can only be fully inserted into the bore in the tool handle when the locking member on the adaptor is in axial alignment with a cooperating locking member on the tool handle.

In accordance with yet another aspect of the invention, a metal ferrule having one or more radial openings for receipt of a locking pin on the locking member may be mounted on aligned cylindrical wall portions on the tool handle and insert.

In accordance with yet another aspect of the invention, the metal ferrule may have one or more tabs that are received in notches in the insert for accurately locating the ferrule with respect to the insert.

In accordance with another aspect of the invention, the locking member may include an integrally molded locking finger which is movable into and out of locking engagement with one or more recesses in the outer end of the tool handle.

In accordance with still another aspect of the invention, the recess may comprise an external slot in the outer end of the tool handle for external engagement by the locking finger.

In accordance with yet another aspect of the invention, an arcuate shield may extend from opposite sides of the locking finger to substantially cover the external slot in the tool handle when engaged by the locking finger.

In accordance with still another aspect of the invention, the recess may comprise an internal slot in the tool handle for internal engagement by the locking finger.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DESCRIPTION OF THE PREFERRED EMBODIMENTS

Figures 1, 2, 3, 4, 5:
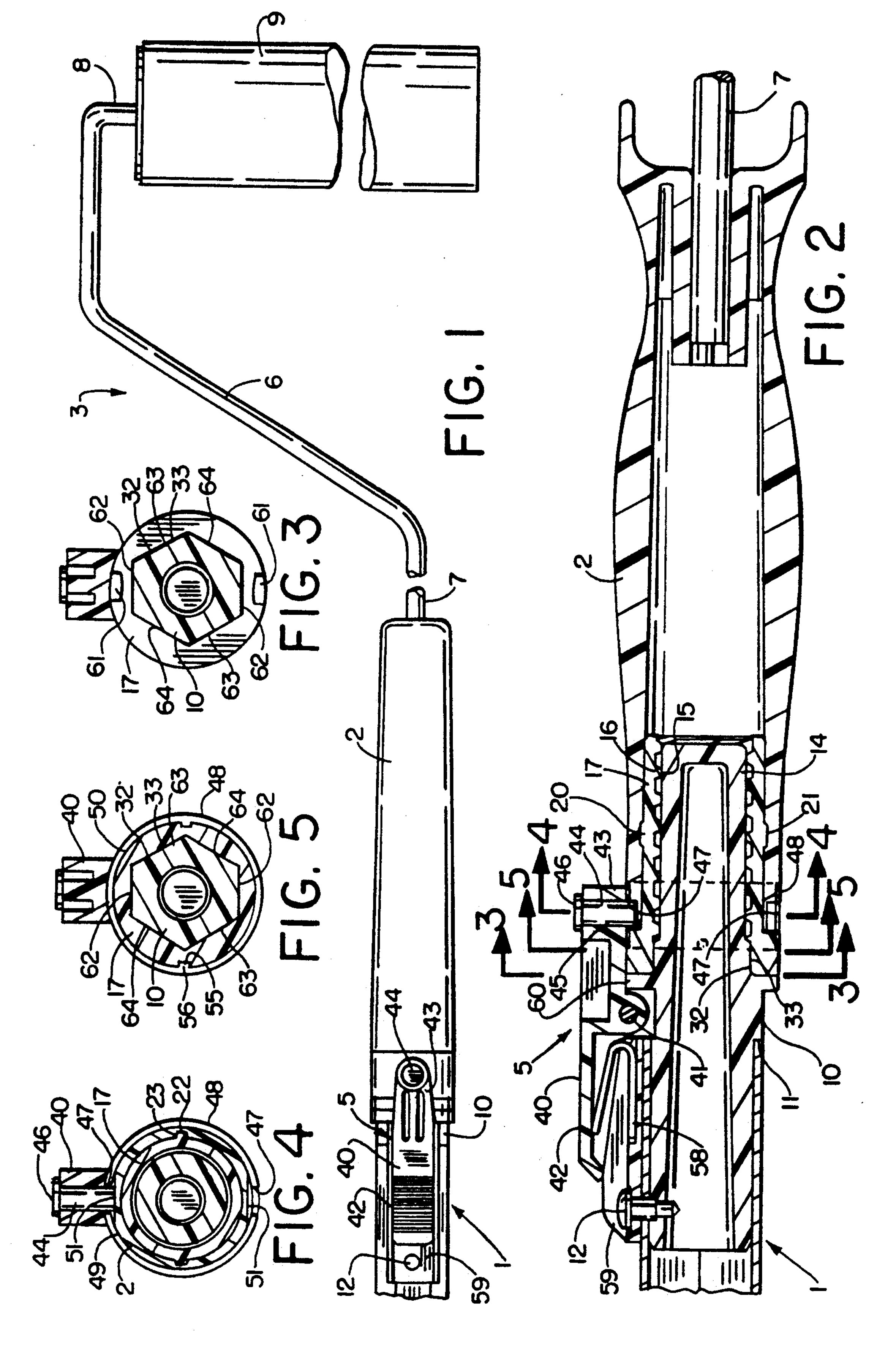
FIG. 1 is a top plan view of one form of quick release lock mechanism in accordance with this invention shown connecting an extension pole to the handle of a paint roller frame or other tool.
FIG. 2 is an enlarged fragmentary longitudinal section through the lock mechanism and associated extension pole and tool handle of FIG. 1.
FIGS. 3 through 5 are fragmentary transverse sections through the lock mechanism of FIG. 2, taken generally on the planes of the lines 3—3, 4—4, and 5—5, respectively.
Figure 10:
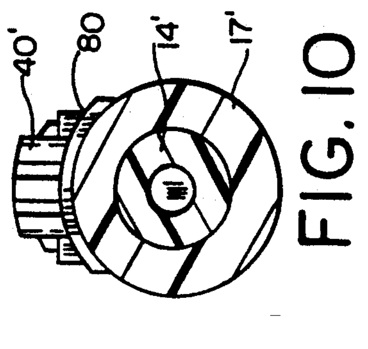
FIGS. 8 through 10 are transverse sections through the lock mechanism of FIG. 7, taken generally on the planes of the lines 8—8, 9—9 and 10—10, respectively.

Referring now in detail to the drawings, and initially to FIGS. 1 and 2, there is shown a portion of an extension pole 1 releasably connected to the handle or hand grip 2 of a tool 3 such as a paint roller by means of one form of quick release lock mechanism 5 in accordance with this invention. The extension pole 1 provides a handle extension for the paint roller, allowing the operator to paint areas that he or she could not otherwise reach without the aid of a ladder, such as ceilings or the like. However, it will be appreciated that the lock mechanism 5 may be used to connect an extension pole to other tools as well. Also, the extension pole 1 may be of a fixed length or consist of a pair of telescoping members adjustable to different lengths, for example, in the manner shown in U.S. Pat. No. 4,662,771, assigned to the same assignee as the present application, which is incorporated herein by reference.

The particular paint roller 3 illustrated in FIG. 1 by way of example includes a frame 6 made from a heavy gauge wire or rod bent to shape to provide a handle portion 7 at one end and a shaft portion 8 at the other end for rotatably supporting a roller assembly 9 thereon. Press fitted onto the outer end of the handle portion 7 is the handle or hand grip 2 which, as shown in FIG. 2, is preferably molded hollow to a relatively large outer diameter out of a relatively inexpensive plastic such as polypropylene. Molding the hand grip to a relatively large size makes it easier to support the tool by one hand during use.

Figure 6:
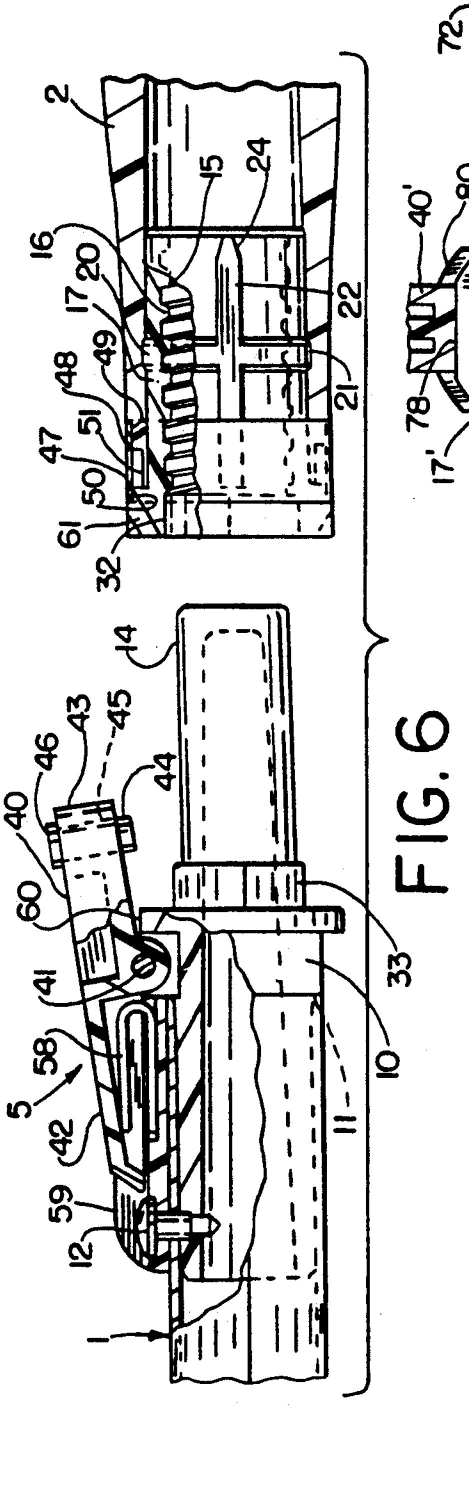
FIG. 6 is an enlarged fragmentary side elevation view of the lock mechanism and associated extension pole and tool handle of FIG. 2, but showing the extension pole disengaged from the tool handle.

To provide for the quick and easy attachment and removal of the extension pole i to and from the hand grip 2, the lock mechanism 5 of the present invention includes a pole adaptor 10 attached to the extension pole 1 (see FIGS. 2 and 6). One end of the pole adaptor 10 has an outer diameter substantially corresponding in size and shape to the inner diameter of the adjacent end of the pole 1 for close sliding receipt therein for a sufficient portion of its length, for example, approximately $1\frac{3}{4}$ inches, to provide adequate bearing support therebetween.

An external shoulder 11 on the pole adaptor 10 limits the extent to which the pole adaptor is inserted into the extension pole. Relative rotation between the extension pole and pole adaptor may be prevented for example by making the mating surfaces a corresponding non-cylindrical shape such as a hex shape. Also, the pole adaptor 10 may be secured to the extension pole 1 in any suitable manner, for example, by providing a screw connection 12 therebetween.

Figures 11, 12, 13, 14, 15:
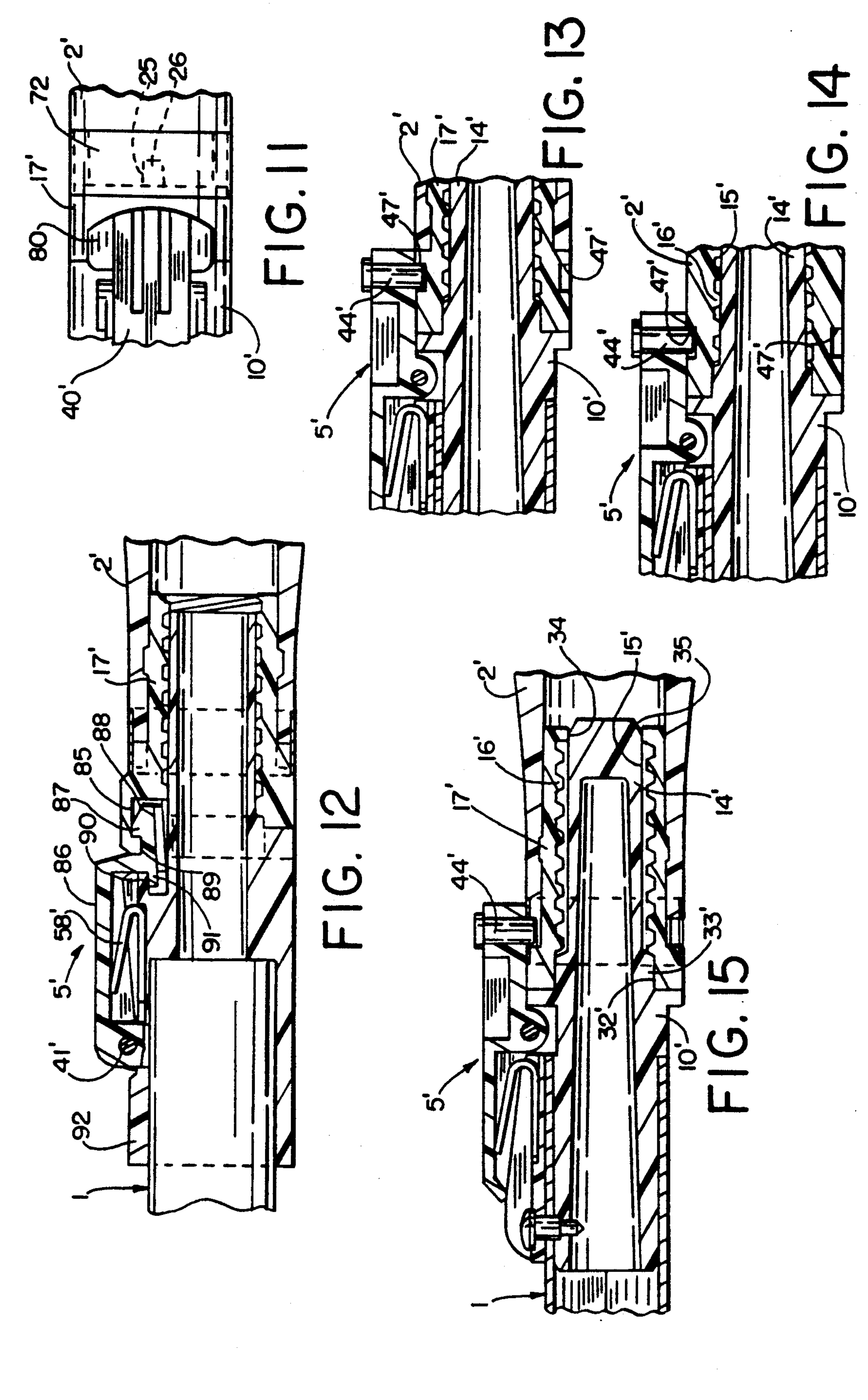
FIG. 11 is a fragmentary top plan view of the lock mechanism and associated extension pole and tool handle of FIG. 7 as generally seen from the plane of the line 11—11 thereof.
FIG. 12 is an enlarged fragmentary longitudinal section through still another form of lock mechanism in accordance with this invention shown connecting an extension pole to a tool handle.
FIGS. 13 and 14 are enlarged fragmentary longitudinal sections through slightly modified forms of the lock mechanism shown in FIG. 2.
FIG. 15 is an enlarged fragmentary longitudinal section through yet another form of lock mechanism in accordance with this invention.

The pole adaptor 10 extends axially outwardly from the extension pole 1 a predetermined distance and includes a smooth cylindrical outer end portion 14 adapted to be freely slidably inserted into an internally threaded bore 15 in the hand grip 2. The purpose of the internal threads 16 is to permit a conventional threaded handle extension (not shown) to be threadedly connected to the hand grip 2 if desired. Such an internal thread 16′ may be molded integral with the hand grip 2′ as schematically shown in FIG. 14. However, if the hand grip 2 is molded hollow to a relatively large size out of a relatively inexpensive plastic such as polypropylene, a separate insert 17 containing the internally threaded bore 15 is preferably snap fitted into the hand grip 2 as schematically shown in FIGS. 2 and 6. Both the pole adaptor 10 and insert 17 may be injection molded out of a suitable engineering plastic such as fiberglass filled nylon for increased strength.

To axially retain the insert 17 within the hand grip 2, the insert is provided with an external annular rib 20 intermediate the length thereof which snaps into an internal annular groove 21 in the hand grip 2 when the insert is snap fitted into place as shown in FIGS. 2 and 6. Relative rotation between the insert and hand grip may be prevented by providing one or more external, longitudinally extending ribs 22 on the insert for receipt in correspondingly shaped longitudinal keyways or slots 23 in the inner diameter of the hand grip 2 (see FIGS. 4 and 6).

The axial inner ends 24 of the external longitudinal ribs 22 on the insert may be generally wedge shaped as shown in FIG. 6 to help guide the longitudinal ribs within the keyways 23 in the hand grip 2 during assembly. Also, both the outer diameter of the insert 17 forwardly of the external annular rib 20 and the inner diameter of the hand grip 2 forwardly of the internal annular groove 21 may taper inwardly at a slight angle to insure a tight fit therebetween.

Figure 8:
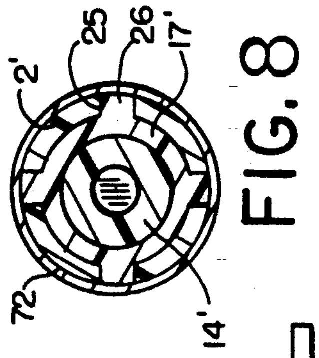

Alternatively, the external longitudinal ribs 22 on the insert 17 and internal longitudinal keyways or slots 23 on the hand grip 2 may be replaced with a plurality of circumferentially spaced keyways or slots 25 in the axial outer end of the hand grip 2′ for receipt of corresponding keys or lugs 26 on the insert 17′ to prevent relative rotation therebetween as schematically shown in FIG. 8.

To support the cylindrical outer end portion 14 of the pole adaptor 10 when inserted into the internally threaded bore 15, a recess 32 is provided adjacent the axial outer end of the insert 17 for seated engagement by a correspondingly shaped external shoulder or flange 33 on the pole adaptor 10 adjacent the axial inner end of the cylindrical outer end portion 14. In edition, the outer diameter of the cylindrical outer end portion 14 desirably substantially corresponds to the minor diameter of the internal threads 16 in the insert 17 whereby the internal threads 16 provide additional bearing support for the cylindrical outer end portion throughout substantially the entire length of the cylindrical outer end portion and internal threads. In the embodiment shown in FIGS. 1 through 6, both the internal threads 16 and the cylindrical outer end portion 14 supported thereby desirably have an axial length of approximately $1\frac{3}{4}$ inches to provide the desired bearing support for the cylindrical outer end portion when fully inserted into the bore 15.

Alternatively, the outer diameter of the cylindrical outer end portion 14' may be made less than the minor diameter of the internal threads 16, to provide a clearance space therebetween as schematically shown in FIG. 15. In that event, a smaller diameter counterbore 34 having an inner diameter substantially corresponding to the outer diameter of the cylindrical outer end portion 14' is desirably provided adjacent the axial inner end of the internally threaded bore 15' to establish an additional bearing support for the cylindrical outer end portion spaced from the first bearing support provided by engagement of the shoulder 33' on the adaptor 10' in the recess 32' in the insert 17' when the cylindrical outer end portion is fully inserted into the bore 15' as schematically shown in FIG. 15. A chamfer 35 is provided on the axial outer end of the cylindrical outer end portion 14' to facilitate insertion into the counterbore 34.

Figure 9:
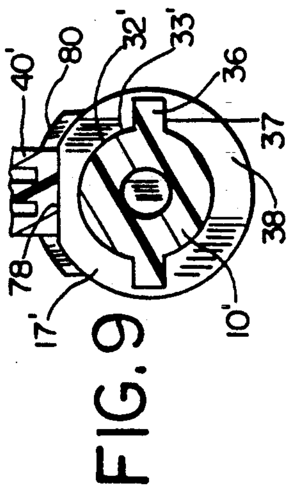
Figure 7:
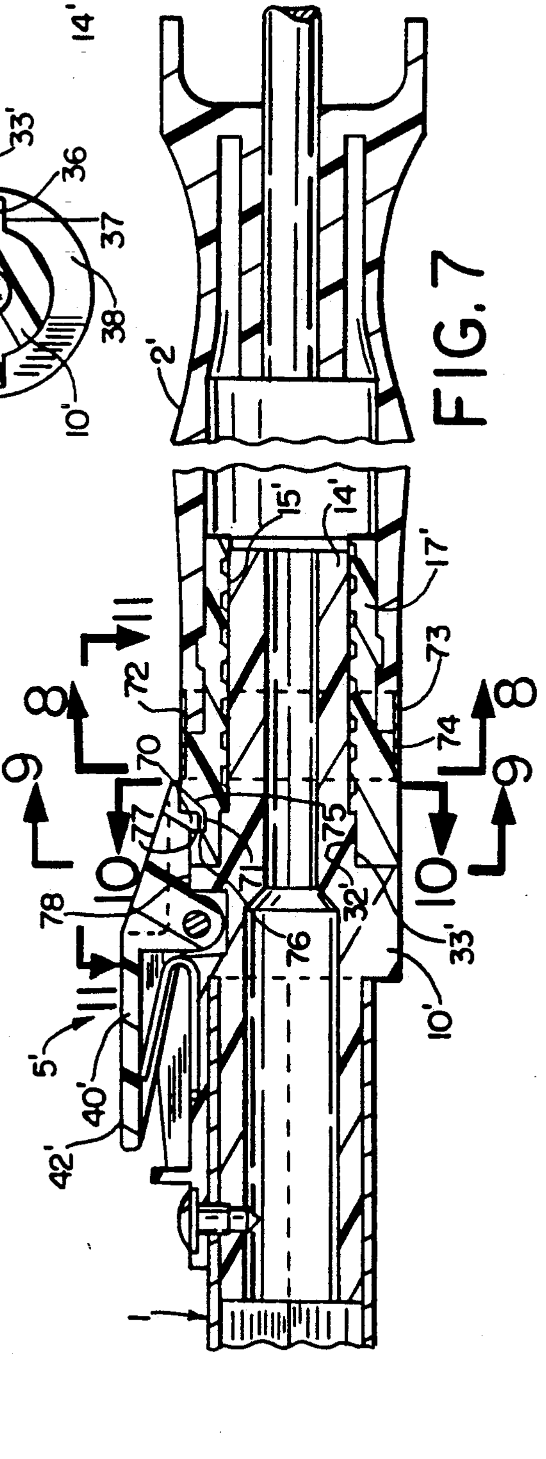
FIG. 7 is an enlarged fragmentary longitudinal section through another form of quick release lock mechanism in accordance with this invention shown connecting an extension pole to a tool handle.

Relative rotation between the pole adaptor 10 and insert 17 may also be prevented by making the recess 32 in the axial outer end of the insert 17 and correspondingly shaped external shoulder 33 on the pole adaptor 10 non-circular. Alternatively, the recess 32' and external shoulder 33' may be cylindrical, and a pair of diametrically opposite external keys or lugs 36 may be provided on the outer diameter of the shoulder 33 adjacent the inner end of the cylindrical outer end portion 14' for receipt in correspondingly shaped keyways or slots 37 in a radial flange 38 at the axial outer end of the insert 17' as schematically shown in FIG. 9.

To releasably retain the extension pole 1 and tool handle 2 together when the cylindrical outer end portion 14 of the pole adaptor 10 is fully inserted into the bore 15 in the tool handle, cooperating latch members are provided on the pole adaptor and tool handle, respectively. In the embodiment shown in FIGS. 1-6, the latch member on the pole adaptor comprises a locking lever 40 pivotally connected intermediate its ends to the pole adaptor proximate the outer end of the extension pole. One end of the locking lever 40 extends rearwardly from the pivot 41 back over the adjacent end of the extension pole to provide a thumb engaging portion 42. The other end 43 of the locking lever extends forwardly of the pivot in radially spaced relation from the cylindrical outer end portion 14 for supporting a lock pin 44 which may be press fitted into a radial hole 45 in such other end. An enlarged portion 46 on the outer end of the lock pin limits the extent of insertion of the lock pin into the hole. When fully inserted, the inner end of the lock pin 44 extends radially inwardly of the locking lever 40 for pivotal movement with the locking lever into and out of engagement with the latch member on the tool handle which in the FIGS. 1-6 embodiment comprises one or more holes 47 adjacent the outer end of the hand grip 2.

Two such holes 47 are desirably provided on opposite sides of the hand grip 2, whereby if one of the holes should become clogged with paint, the hand grip can be rotated 180° relative to the extension pole to permit the lock pin 44 to engage the other hole and vice versa.

The holes 47 are desirably formed in a metal ferrule 48 which is slipped over a reduced diameter cylindrical wall portion 49 at the axial outer end of the hand grip 2 before the insert 17 is pressed into place. The insert 17 also includes a reduced diameter cylindrical wall portion 50 of the same diameter as the cylindrical wall portion 49 on the hand grip 2 for extension of a portion of the ferrule 48 thereover. The shoulders at the ends of the reduced diameter cylindrical wall portions 49, 50 desirably have a height substantially corresponding to the thickness of the ferrule 48, so that the exterior of the ferrule is substantially flush with the adjacent exterior surfaces of the hand grip 2 and insert 17, respectively. Also, flat surfaces 51 are desirably provided on opposite sides of the reduced diameter cylindrical wall portion 49 of the hand grip 2 in alignment with the holes 47 through the ferrule 48 to provide a clearance space for the lock pin 44 when inserted through the holes (see FIGS. 4 and 6).

To properly orient the ferrule 48 with respect to the insert 17, a pair of diametrically spaced apart notches 55 are provided in the reduced diameter cylindrical wall portion 50 of the insert 17 for receipt of a pair of correspondingly spaced tabs 56 on the ferrule (see FIG. 5).

The outer end of the locking lever 40 is spring biased toward the pole adaptor 10 by a hair pin spring 58 trapped between a lever guard 59 extending rearwardly from the pivot pin 41 and the underside of the thumb engaging portion 42 of the locking lever. In the embodiment depicted in FIGS. 1 through 6, the lever guard 59 is made separately from the locking lever and is retained in place by the pivot pin 41 which extends through aligned openings in both the lever guard and locking lever and the fastening screw 12 which extends through a hole in the lever guard as well as through aligned holes in the extension pole 1 and pole adaptor 10. However, it will be appreciated that the lever guard 59 could be integrally formed with the locking lever 40 if desired.

The maximum extent of pivotal movement of the locking lever 40 and lock pin 44 toward the pole adaptor 10 is limited by a stop flange 60 on the pole adaptor located between the pivot pin 41 and shoulder 33.

During insertion of the cylindrical outer end portion 14 of the pole adaptor 10 into the internally threaded bore 15, as long as the locking pin 44 is in axial alignment with one of the holes 47 in the ferrule 48, the locking pin 44 will ride up over a ramp 61 on the outer end of the insert 17 (see FIGS. 3 and 6) and snap into the aligned hole 47, thereby locking the hand grip 2 to the extension pole 1.

Such axial alignment may be facilitated by making the recess 32 in the insert 17 and shoulder 33 on the pole adaptor 10 of such a corresponding asymmetrical shape that the recess 32 will only receive the shoulder 33 when the locking pin 44 is in axial alignment with either one of the holes 47. In the embodiment shown in FIGS. 1 through 6, this is accomplished by making the recess 32 and shoulder 33 of a generally hexagonal shape, but with the distance between one opposite pair of flats 62 on the recess 32 and shoulder 33 being greater (or alternatively less) than the distance between the other two opposite pairs of flats 63 and 64 (see FIGS. 3 and 5).

Alternatively, both the recess 32' and shoulder 33' may be generally cylindrical in shape and the same desired axial alignment still obtained by appropriately orienting the pair of keyways or slots 37 in the insert 17' and pair of corresponding keys or lugs 36 on the pole adaptor 10' schematically shown in FIG. 9 so that the keyways 37 will only receive the lugs 36 when the lock pin is in axial alignment with either one of the pin receiving holes.

To remove the extension pole 1 from the tool handle 2, all the operator need do is press down on the lever thumb engaging portion 42 to disengage the lock pin 44 from one of the holes 47 in the ferrule 48 and pull the pole adaptor 10 axially out of the insert 11 as schematically shown in FIG. 6.

FIGS. 13 and 14 show modified forms of quick release lock mechanisms 5' in accordance with this invention in which the metal ferrule 48 has been eliminated and the two holes 47' for the lock pin 44' are provided in opposite sides of either the axial outer end portion of the insert 17' as in FIG. 13 or in the tool handle itself as in FIG. 14.

FIGS. 7 through 11 show still another form of quick release lock mechanism 5' in accordance with this invention which is similar in many respects to that shown in FIGS. 1 through 6. However, it differs in the use of circumferentially spaced keyways or slots 25 in the axial outer end of the hand grip 2' for receipt of corresponding keys or lugs 26 on the insert 17' to prevent relative rotation therebetween (see FIG. 8). Also, relative rotation between the pole adaptor 10' and insert 17' is prevented by providing two or more external keys or lugs 36 on the outer diameter of the pole adaptor adjacent the inner end of the cylindrical outer end portion 14' for receipt in correspondingly shaped keyways or slots 37 in a radial flange 38 at the axial outer end of the insert 17' (see FIG. 9).

The lock mechanism 5' shown in FIGS. 7 through 11 also differs from the lock mechanisms previously described in the provision of an integrally molded lock finger 70 on the outer end of the locking lever 40' for pivotal movement into and out of locking engagement with an external transverse slot 71 in the tool handle insert 17' adjacent the axial outer end thereof. A metal ferrule 72 is shown inserted over aligned reduced diameter cylindrical wall portions 73, 74 on the hand grip 2' and insert 17'. However, the ferrule 72 and associated reduced diameter cylindrical wall portions 73, 74 could be eliminated if desired, as they have in the lock mechanism shown in FIG. 13.

In FIGS. 7-11, the lock finger 70 faces radially inwardly for radial movement into and out of engagement with the external slot 71 on the insert 17'. The axial inner wall 75 of the slot 71 desirably slopes outwardly at an angle to facilitate pivotal swinging movement of the lock finger 70 into and out of the slot. However, the axial outer wall 76 of the slot 71 extends generally radially, as does the corresponding face 77 of the lock finger 70 when received in the slot. This prevents removal of the extension pole 1 from the tool handle 2' until the thumb engaging portion 42, of the lock lever 40' is depressed to cause the lock finger 70 to move radially out of the transverse slot 71. A flat transverse wall 78 may be provided at the axial outer end of the insert 17' in line with the slot 71 for guiding the lock finger 70 into engagement with the slot during insertion of the cylindrical outer end portion 14' of the pole adaptor 10' into the insert 17'.

The lock mechanism 5' of the FIGS. 7 through 11 embodiment also desirably includes an arcuate shield 80 integrally molded on the outer end of the lock lever 40'. Shield 80 extends circumferentially beyond opposite sides of the lock finger 70 and substantially covers the transverse slot 71 in the insert 17' when the lock finger 70 is engaged in the slot to keep paint and the like from running into the slot during use of the tool.

FIG. 12 shows still another form of quick release lock mechanism 5' in accordance with this invention which is generally similar to the lock mechanism shown in FIGS. 7-11. However, the latch member on the tool handle 2' differs in that it comprises an internal slot 85 in the axial outer end of the insert 17' rather than an external slot as in the FIGS. 7 through 11 embodiment.

The latch member on the pole adaptor 10' comprises a pivotally mounted locking lever 86 having a locking finger 87 integrally formed therewith. However, the locking finger 87 faces generally radially outwardly for engagement with the internal slot 85. Also, the leading face 88 of the locking finger 87 slopes inwardly at an angle for camming engagement against the radial inner edge 89 of the axial innermost end of the insert 17' during insertion of the cylindrical outer end portion 14' of the pole adaptor 10' into the insert.

The hair pin spring 58' is located forwardly of the pivot pin 41' for urging the locking finger 87 radially outwardly. The maximum extent of radial outward movement of the locking lever 86 is limited by a stop shoulder 90 on the pole adaptor which axially overlaps a flange 91 on the locking lever.

To accommodate the hair pin spring 58', the length of the locking lever 86 forwardly of the pivot pin 41' must be increased. Preferably this is done without increasing the spacing between the extension pole 1 and tool handle 2' when in the fully latched position by making the end 92 of the pole adaptor which is attached to the extension pole large enough to telescope over the adjacent end of the extension pole and locating the pivot pin 41' sufficiently back along the telescoping end 92 of the pole adaptor to accommodate the additional locking lever length.

Providing an internal slot 85 for the locking finger 87 has the advantage that the slot is better protected against clogging with paint and the like during use of the tool than if the slot were located externally of the tool handle.

When the cylindrical outer end portion 14' of the pole adaptor 10' is fully inserted into the insert 17', the hair pin spring 58' will move the locking finger 87 radially outwardly into engagement with the internal slot 85, thus locking the extension pole and tool handle together. Before the extension pole and tool handle can be pulled apart, the locking lever 86 must be depressed to disengage the locking finger 87 from the internal slot 85.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A lock mechanism for releasably connecting an extension pole to a tool handle comprising adaptor means attached to an end of said extension pole, said tool handle having an internally threaded bore, said adaptor means having a generally smooth cylindrical outer end portion axially slidable into and out of said internally threaded bore, means for providing bearing support for said cylindrical outer end portion when fully inserted into said bore, and latch means for releasably retaining said cylindrical outer end portion with said bore.

2. The lock mechanism of claim 1 wherein said means for providing bearing support for said cylindrical outer end portion comprises a recess in said tool handle, and a shoulder on said adaptor means engageable in said recess when said cylindrical outer end portion is fully inserted into said bore.

3. The lock mechanism of claim 2 wherein said means for providing bearing support for said cylindrical outer end portion further comprises internal threads in said bore which have a minor diameter substantially corresponding to an outer diameter of said cylindrical outer end portion.

4. The lock mechanism of claim 2 wherein said means for providing bearing support for said cylindrical outer end portion further comprises a counterbore adjacent an axial inner end of said bore in which an axial outer end of said cylindrical outer end portion is received when said cylindrical outer end portion is fully inserted into said bore, said counterbore having an inner diameter less than a minor diameter of said bore, and said axial outer end of said cylindrical outer end portion having an outer diameter substantially corresponding to the inner diameter of said counterbore.

5. The lock mechanism of claim 1 further comprising means for preventing relative rotation between said adaptor means and said tool handle when said cylindrical outer end portion is fully inserted into said bore.

6. The lock mechanism of claim 5 wherein said means for preventing relative rotation between said adaptor means and said tool handle comprises a non-circular shaped recess in said tool handle, and a correspondingly shaped shoulder on said adaptor means engageable in said recess when said cylindrical outer end portion is fully inserted into said bore.

7. The lock mechanism of claim 6 wherein said means for providing bearing support for said cylindrical outer end portion comprises bearing engagement of said shoulder on said adaptor means in said recess in said tool handle when said cylindrical outer end portion is fully inserted into said bore.

8. The lock mechanism of claim 7 wherein said latch means comprises lever means on said adaptor means and opening means in said tool handle engageable by said lever means when said cylindrical outer end portion is fully inserted into said bore and said lever means is in axial alignment with said opening means, said recess and said shoulder being asymmetrically shaped such that said shoulder is only engageable in said recess when said lever means is in axial alignment with said opening means.

9. The lock mechanism of claim 8 wherein there are two of said opening means in diametrically opposite sides of said tool handle, said shoulder on said adaptor means being receivable in said recess in said tool handle only when said lever means is in axial alignment with either one of said opening means.

10. The lock mechanism of claim 5 wherein said means for providing bearing support for said cylindrical outer end portion comprises a recess in said tool handle, and a correspondingly shaped shoulder on said adaptor means engageable in said recess when said cylindrical outer end portion is fully inserted into said bore.

11. The lock mechanism of claim 10 wherein said means for preventing relative rotation between said adaptor means and said tool handle comprises the engagement of said shoulder in said recess, which are non-circular in shape.

12. The lock mechanism of claim 10 wherein said means for preventing relative rotation between said adaptor means and said tool handle comprises a pair of diametrically spaced apart keyways in said tool handle, and a pair of diametrically spaced keys on said adaptor means engageable in said keyways when said cylindrical outer end portion is fully inserted into said bore.

13. The latch mechanism of claim 12 wherein said latch means comprises lever means on said adaptor means and opening means in said tool handle engageable by said lever means when said cylindrical outer end portion is fully inserted into said bore and said lever means is in axial alignment with said opening means, the orientation of said keyways in said tool handle and said keys on said adaptor means being such that said latch means is in axial alignment with said opening means when said keys are in engagement with said keyways.

14. The lock mechanism of claim 1 wherein said tool handle includes a hollow plastic molded hand grip, and insert means within said tool handle, said insert means containing said internally threaded bore.

15. The lock mechanism of claim 14 wherein said tool handle includes a hollow plastic molded hand grip, and said insert means has a snap fit in said hand grip.

16. The lock mechanism of claim 15 wherein said hand grip is made of polypropylene and said insert means is made of fiberglass filled nylon.

17. The lock mechanism of claim 15 wherein said insert means has an external annular rib which is snap fitted into an internal annular groove in said hand grip for retaining said insert means within said hand grip.

18. The lock mechanism of claim 17 wherein said insert means has external longitudinally extending rib means received in correspondingly shaped internal longitudinal slot means in said hand grip for preventing relative rotation between said insert means and said hand grip.

19. The lock mechanism of claim 14 further comprising means for preventing relative rotation between said adaptor means and said insert means when said cylindrical outer end portion is fully inserted into said bore.

20. The lock mechanism of claim 19 wherein said means for preventing relative rotation between said adaptor means and said insert means comprises a non-circular shaped recess in an axial outer end of said insert means, and a correspondingly shaped external shoulder on said adaptor means which is received in said recess when said cylindrical outer end portion is fully inserted into said bore.

21. The lock mechanism of claim 19 wherein said means for preventing relative rotation between said adaptor means and said insert means comprises plural external lugs on said adaptor means which are received in corresponding slots in an axial outer end of said insert means when said cylindrical outer end portion is fully inserted into said bore.

22. The lock mechanism of claim 14 wherein said latch means comprises lever means on said adaptor means and recess means in said hand grip or insert means engageable by said lever means when said cylindrical outer end portion is fully inserted into said bore, and spring means for biasing said lever means toward said recess means.

23. The lock mechanism of claim 22 further comprising stop means for limiting the maximum amount of movement of said lever mans by said spring means.

24. The lock mechanism of claim 22 wherein said recess means comprises at least one hole in a ferrule extending between cylindrical wall portions on said hand grip and said insert means, and said lever means comprises a locking pin movable by said lever means into and out of engagement with said hole when brought into alignment therewith.

25. The lock mechanism of claim 24 wherein said cylindrical wall portion on said hand grip has a flat surface in alignment with said hole in said ferrule to provide a clearance space for said lock pin when inserted into said hole.

26. The lock mechanism of claim 24 further comprising tab means on said ferrule engageable in notches in said cylindrical wall portion on said insert means for orienting said ferrule with respect to said insert means.

27. The lock mechanism of claim 24 wherein there are a pair of diametrically spaced apart holes in said ferrule, said locking pin being engageable with either of said holes upon orienting said hand grip relative to said extension pole so that said locking pin is in axial alignment with either of said holes before said cylindrical outer end portion is fully inserted into said bore.

28. The lock mechanism of claim 1 wherein said latch means comprises lever means on said adaptor means and recess means in said tool handle engageable by said lever means when said cylindrical outer end portion is fully inserted into said bore.

29. The lock mechanism of claim 28 wherein said recess means comprises slot means in said tool handle, and said lever means comprises finger means movable into and out of engagement with said slot means when brought into alignment therewith.

30. The lock mechanism of claim 29 wherein said slot means comprises an external slot in said tool handle, and spring means are provided for urging said finger means radially inwardly into engagement with said external slot.

31. The lock mechanism of claim 30 further comprising shield means on said lever means for substantially covering said external slot when said finger means is in engagement with said external slot.

32. The lock mechanism of claim 29 wherein said slot means comprises an internal slot in said tool handle, and spring means are provided for urging said finger means radially outwardly into engagement with said internal slot.

33. The lock mechanism of claim 29 wherein said finger means has a beveled end face to facilitate camming of said finger means over an end wall of said tool handle during insertion of said cylindrical outer end portion into said bore.

34. The lock mechanism of claim 28 wherein said lever means includes a locking pin movable with said lever means into and out of engagement with said recess means when brought into alignment therewith, and ramp means on an axial outer end of said tool handle to facilitate camming of said locking pin over said axial outer end of said tool handle during insertion of said cylindrical outer end portion into said bore.

35. The lock mechanism of claim 28 further comprising pivot means pivotally connecting said lever means to said adaptor means proximate said end of said extension pole intermediate the ends of said lever means, said lever means having one end extending rearwardly over said end of said extension pole to provide a thumb engaging portion, and another end extending forwardly of said end of said extension pole in radially spaced relation from said cylindrical outer end portion of said adaptor means, said another end of said lever means having finger means thereon engageable with said recess means when brought into alignment therewith, and spring means positioned between said end of said extension pole and said thumb engaging portion for urging said finger means radially inwardly toward said cylindrical outer end portion of said adaptor means.

36. The lock mechanism of claim 35 further comprising lever guard means extending rearwardly from said pivot means over said end of said extension pole, said spring means being positioned between said lever guard means and said thumb engaging portion of said lever means.

37. The lock mechanism of claim 28 wherein said adaptor means has another end portion which is telescopingly received over said end of said extension pole, and pivot means are provided for pivotally connecting said lever means to said another end portion of said adaptor means radially outwardly of said end of said extension pole, said lever means extending forwardly of said pivot means beyond said end of said extension pole, said lever means having radially outwardly facing finger means thereon, and said recess means comprising an internal slot in said tool handle engageable by said finger means when said cylindrical outer end portion is fully inserted into said bore, spring means positioned axially outwardly of said pivot means for urging said finger means radially outwardly, and stop means for limiting such radial outward movement of said finger means by said spring means.

38. A tool handle comprising a hand grip containing an internally threaded bore, means for preventing relative rotation between a pole adaptor and said hand grip when a smooth cylindrical outer end portion on said pole adaptor is fully inserted into said bore, and latch means for releasably retaining said cylindrical outer end portion within said bore.

39. The tool handle of claim 38 further comprising means for providing bearing support for said cylindrical outer end portion when fully inserted into said bore.

40. The tool handle of claim 39 wherein said means for providing bearing support for said cylindrical outer end portion comprises a recess in said hand grip for receipt of a correspondingly shaped shoulder on said pole adaptor when said cylindrical outer end portion is fully inserted into said bore.

41. The tool handle of claim 40 wherein said means for providing bearing support for said cylindrical outer end portion further comprises said internally threaded bore which has a minor diameter substantially corresponding to the outer diameter of said cylindrical outer end portion.

42. The tool handle of claim 40 wherein said means for providing bearing support for said cylindrical outer end portion further comprises a counterbore adjacent an axial inner end of said threaded bore in which an axial outer end of said cylindrical outer end portion is received when said cylindrical outer end portion is fully inserted into said bore, said counterbore having an inner diameter less than the minor diameter of said threaded bore, and said axial outer end of said cylindrical outer end portion having an outer diameter substantially corresponding to the inner diameter of said counterbore.

43. The tool handle of claim 38 further comprising insert means snap fitted into said hand grip, and means for preventing relative rotation between said insert means and said hand grip, said insert means containing said internally threaded bore.

* * * * *